Figure 1A:
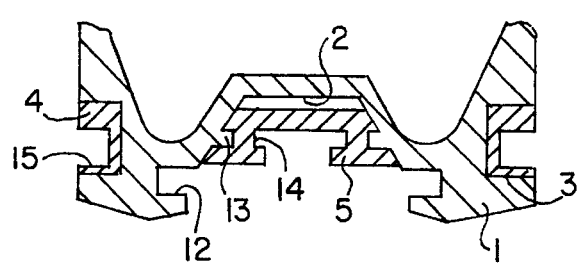

United States Patent [19]

Graham

[11] Patent Number: 5,497,691
[45] Date of Patent: Mar. 12, 1996

[54] RAIL LAUNCHER FOR AIRBORNE MISSILES

[76] Inventor: Thomas C. Graham, 117 Fulwell Rd., Teddington, Middlesex, United Kingdom

[21] Appl. No.: 193,021

[22] PCT Filed: Aug. 10, 1992

[86] PCT No.: PCT/GB92/01479

§ 371 Date: Apr. 29, 1994

§ 102(e) Date: Apr. 29, 1994

[87] PCT Pub. No.: WO93/03321

PCT Pub. Date: Feb. 18, 1993

[30] Foreign Application Priority Data

Aug. 8, 1991 [GB] United Kingdom .................. 9117066

[51] Int. Cl.⁶ .............................. F41F 3/06; B64D 7/08
[52] U.S. Cl. ........................................................ 89/1.819
[58] Field of Search .................... 89/1.819, 1.815

[56] References Cited

U.S. PATENT DOCUMENTS

| | | | |
|---|---|---|---|
| 4,392,411 | 7/1983 | Minkler | 89/1.819 |
| 4,660,456 | 4/1987 | Griffin et al. | 89/1.819 |
| 4,711,151 | 12/1987 | Griffin et al. | 89/1.805 |
| 4,911,059 | 3/1990 | Brueckner | 89/1.819 |
| 4,926,740 | 5/1990 | Griffin et al. | 89/1.819 |
| 5,148,734 | 9/1992 | Lilly | 89/1.815 |

FOREIGN PATENT DOCUMENTS

| 0136917 | 3/1984 | European Pat. Off. . |
|---|---|---|
| 2166526 | 5/1986 | United Kingdom . |

*Primary Examiner*—Charles T. Jordan
*Attorney, Agent, or Firm*—Myers, Liniak & Berenato

[57] ABSTRACT

A single fixed rail of a rail launcher for airborne missiles has a central longitudinal track in its underside and a pair of side tracks. Removable or relocatable rail track adaptors are fitted into both the central track and the pair of side tracks.

16 Claims, 2 Drawing Sheets

RAIL LAUNCHER FOR AIRBORNE MISSILES

This invention relates to rail launchers for airborne missiles.

There are a wide variety of rail-launched missiles in general use, almost all imposing different mechanical interfaces and thereby requiring, until recently, a dedicated rail launcher to operate satisfactorily. Recent years have seen the development of rail launchers capable of interfacing and operating with more than one missile in order to provide users with operational, logistic and cost benefits.

The most operationally useful group of short range and medium range missiles comprises the AMRAAM, Sidewinder, ASRAAM and Sparrow (including Aspide) families of missiles, and multi-role launchers have been developed to carry these missiles either by:

(i) the use of two launchers, one for AMRAAM, Sidewinder and ASRAAM and the other for Sparrow; or by (ii) the use of a single launcher but with two interchangeable rails, whereby different interface requirements can be accommodated, rail change being achieved either by a suitable quick release connection or by multiple fasteners. (see for example: EP-A-0136917, GB-A-2166526, US-A-4660456 and US-A-4711151).

However, whilst these methods can provide significant benefits, compared to using four separate launchers, they still involve appreciable operational, logistic, mass or cost problems.

In order to overcome the inadequacies of the current multi-role launchers we have sought a method of providing for the operation of AMRAAM, Sidewinder, ASRAAM, Sparrow and/or other existing or, as yet, not developed types of missiles from a single launcher without having to change the rail.

According to the present invention, a single fixed rail has a central longitudinal track in its underside and a pair of side tracks, and removable or relocatable rail track adaptors are fitted into both the central track and the pair of side tracks. In the preferred arrangement, the desired change of rail configuration is achieved by fitting or removing the central rail track adaptor and by inverting the side track adaptors which are vertically asymmetrical. Removing the central adaptor may be achieved simply by shifting it along its track to an inoperative position.

Thus, in a first aspect of the present invention, we provide a rail launcher adaptable for co-operation with airborne missiles having differing hanger configurations by providing a plurality of rail configurations, said launcher being characterised in comprising a single fixed rail having a central longitudinal track in its underside and a pair of side tracks, and removable or relocatable rail track adaptors for both the central track and the pair of side tracks.

By incorporating local rail adaptors into a common fixed rail then, depending upon the orientation/location of these adaptors, the launcher interface geometry can be readily changed to provide one of two (or more) configurations.

In a second and alternative aspect of the present invention, we provide a method of adapting a rail launcher from a first rail configuration adapted for co-operation with hangers of a first set of airborne missiles to a second rail configuration adapted for co-operation with hangers of a different set of airborne missiles by removing or relocating adaptors for a central longitudinal track and a pair of side tracks of a single fixed rail.

In one configuration, AMRAAM, Sidewinder and ASRAAM missiles can be directly operated or, in the other configuration, Sparrow, Sidewinder and ASRAAM can be directly operated. Adaptor repositioning is only required to change between AMRAAM and Sparrow, with the change of configuration being quick and simple to perform and readily capable of being carried out whilst the launcher is attached to the aircraft.

Additional benefits are provided in that (i) all the adaptors can be retained on the launcher in both configurations, if required, and (ii) the use of these adaptors makes it possible to selectively employ suitable adaptor materials to cater for high bearing loads (especially in the case of the Sparrow button) without compromising the main fixed rail.

Figure 1B:
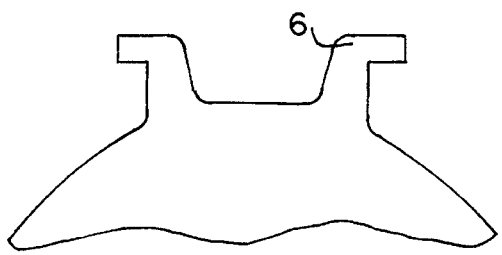
Figure 1C:
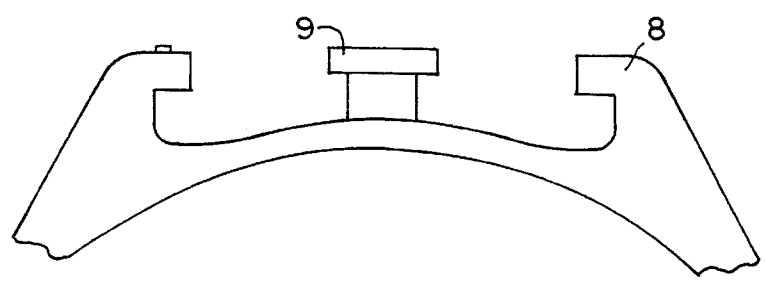
Figure 2A:
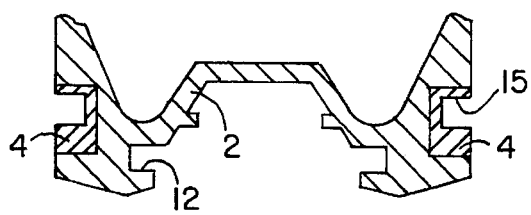
Figure 2B:
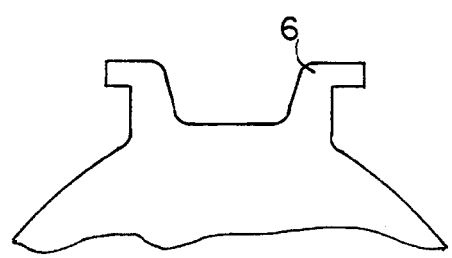
Figure 2C:
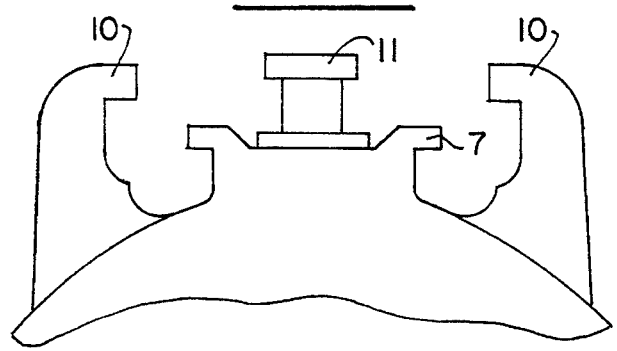
Figure 3A:
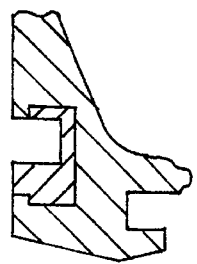
Figure 3B:
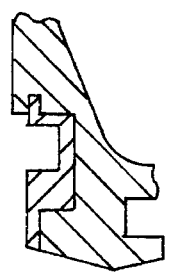
Figure 3C:
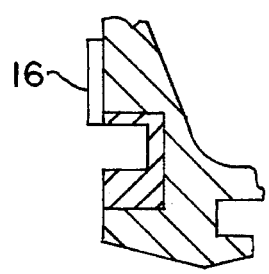
Figure 3D:
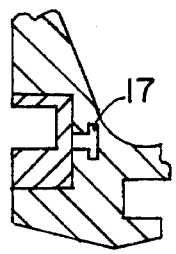
Figure 3E:
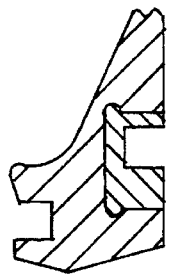

Arrangements according to the invention will now be described in more detail by way of example, with reference to the accompanying drawings, in which:

FIG. 1A shows an embodiment of rail launcher constructed in accordance with the present invention at together with the profile for Sidewinder and ASRAAM hanger configurations at FIG. 1B and for the Sparrow hanger configuration at FIG. 1C with which the rail launcher in the configuration illustrated in FIG. 1A is adapted to cooperate;

FIG. 2A shows the rail launcher of FIG. 1A with its central track adaptor removed or relocated and the side track adaptors inverted together with the profile of Sidewinder and ASRAAM hangers at FIG. 2B and of AMRAAM hangers at FIG. 2C with which the rail launcher in the configuration shown in FIG. 2A is adapted to co-operate; and FIG. 3A through 3E illustrate five alternative configurations respectively for the side tracks and side track adaptors illustrating how the adaptors may be mounted to the side tracks in the rail launcher of FIGS. 1A and 2A.

The main components of the system are illustrated in FIG. 1A and comprise the common fixed rail 1 having a central longitudinal track 2 and a pair of side tracks 3. The side tracks 3 are provided with a pair of side track adaptors 4 and the central longitudinal track has a central track adaptor 5.

Missiles of the Sidewinder and of the ASRAAM families have "TEE"-hangers as indicated schematically at 6 in both FIG. 1B and 2B. Missiles of the AMRAAM family have forward and aft hangers of "TEE"-hanger configuration as indicated schematically at 7 in FIG. 2B. Hangers of the Sparrow family have one pair of "CEE"-hangers and a central button as respectively shown schematically at 8 and 9 in FIG. 1C Missiles of the AMRAAM family have "CEE"-hangers 10 and a forward button 11 co-located with the forward one of the "TEE"-hangers 7 mentioned above, as schematically shown in FIG. 2C.

As will be explained, the illustrated embodiment of rail launcher is readily adapted to receive hangers with the configurations possessed by all these families of missiles.

The fixed rail provides common slots 12 adapted to receive the "TEE"-hangers for AMRAAM (forward and aft hangers), ASRAAM (all hangers) and Sidewinder (all hangers).

The central track adaptor 5 which is longitudinally slidable on rails 13 in the central track is profiled at 14 to receive the central button 9 of Sparrow hangers. The side tracks are located in relation to the profiled region 14 of the central track adaptors such that with the side track adaptors in the orientation illustrated in FIG. 1A, the "CEE"-hangers of the Sparrow hanger configuration are received in slots 15 of the side tracks simultaneously with the central button 9 being received in the profile 14 of the central track adaptor.

Inversion of the side track adaptors 4 to provide the configuration shown in FIG. 2A enables the "TEE"-hangers 7 and the "CEE"-hangers 10 of the AMRAAM hanger configuration to be simultaneously received in the slots 12 of the central track and the slots 15 of the side track adaptors. As will also be clear from FIG. 2A, in order to accommodate the forward button 11 within the central track, its adaptor is longitudinally slid out of the way. Unlike the Sparrow button which is used for rail launching, the AMRAAM button is only used when AMRAAM missiles are launched from an eject launcher. The AMRAAM button is thus inoperative in the illustrated rail launcher and merely needs to be accommodated spacewise, as it does not need to coact with any part of the structure.

Retention of the side rail adaptors in the side rail can be achieved in a number of ways and five alternative ways are illustrated in FIG. 3A through 3E FIG. 3A, 3B, 3D and 3E, this is achieved by giving the side rail a re-entrant profile (for example dovetail or similar) with the adaptor being longitudinally slidably received therein. In the alternative arrangement of FIG. 3C, a separate keeper plate 16 or the like bolted into position holds the side track adaptor in place. In the FIG. 3D configuration, the rear surface of the side track adaptor is provided with local buttons which key in a keyhole slot 17 in the rear surface of the side track.

The preferred embodiment of rail launcher has the particular advantage that in one rail configuration it can accept any of the Sidewinder, ASRAAM and Sparrow families of missiles and in the alternative configuration is capable of receiving any of the Sidewinder, ASRAAM and AMRAAM families of missiles so that a change between one configuration and the other is only necessary when the launcher is in the FIG. 1A configuration and it is desired to use an AMRAAM missile or in the FIG. 2A arrangement and it is desired to use a Sparrow missile. Moreover, adaptation from one configuration to the other could not be simpler. The central track adaptor is simply slid longitudinally into or out of place (which may or may not involve complete removal from the track) and the side track adaptors are simply inverted, preferably by longitudinally sliding out and then longitudinally sliding back in the inverted configuration.

Although the invention has been particularly described and illustrated with reference to the AMRAAM, Sidewinder, ASRAAM and Sparrow families of missiles, the present teachings can readily be applied to rail launchers for other existing families of missiles or to future families of missiles as yet not developed.

I claim:

1. A method of adapting a rail launcher from a first rail configuration adapted for co-operation with hangers of a first set of airborne missiles to a second rail configuration adapted for co-operation with hangers of a different set of airborne missiles by relocating adaptors for a central longitudinal track and a pair of side tracks of a single fixed rail.

2. A method according to claim 1, wherein said first rail configuration is adapted for cooperation with hangers having Sparrow, Sidewinder, and ASRAAM configurations, and wherein said second rail configuration is adapted for co-operation with hangers having AMRAAM, Sidewinder and ASRAAM configurations.

3. A method according to claim 2, wherein said rail launcher is adaptable from said first configuration to said second configuration by effectively removing said central adaptor by longitudinal sliding and inversion of the side track adaptors, the side track adaptors being vertically asymmetrical.

4. The method according to claim 3, further comprising the step of disengaging said central adaptor from said rail launcher.

5. The method according to claim 1, further comprising the step of removing said adaptors from said central longitudinal track.

6. A rail launcher adaptable for cooperation with airborne missiles having differing hanger configurations by providing a plurality of rail configurations, said launcher being characterised in comprising a single fixed rail having a central longitudinal track in its underside and a pair of side tracks, and relocatable rail track adaptors for both the central track and the pair of side tracks.

7. A rail launcher according to claim 6, wherein said fixed rail and rail track adapters enable said launcher to accept Sidewinder, ASRAAM and Sparrow missile hanger configurations.

8. A rail launcher according to claim 6, wherein said fixed rail and rail track adapters enable said launcher to accept AMRAAM, Sidewinder and ASRAAM missile hanger configurations.

9. A rail launcher according to claim 6, wherein said rail track adaptors are removable from said central longitudinal track.

10. A rail launcher adaptable for cooperation with airborne missiles having differing hanger configurations by providing a plurality of rail configurations, said launcher comprising a single fixed rail having a central longitudinal track in its underside and a pair of side tracks, and relocatable rail track adapters for both the central track and the pair of side tracks, a change of rail configuration being achievable by fitting said central track adapter, and by inverting the side track adapters, the side track adapters being vertically asymmetrical.

11. A rail launcher according to claim 10, further characterised in that the single fixed rail is provided with slots adapted to receive TEE-hangers of Sidewinder and ASRAAM configurations and also TEE-hangers present in the AMRAAM hanger configuration.

12. A rail launcher according to claim 10, further characterised in that said central track adaptor is provided with a slot adapted to receive a central button of a Sparrow hanger configuration.

13. A rail launcher according to claim 10, wherein the central longitudinal track is configured to accommodate a forward button of an AMRAAM hanger configuration when said central adaptor is removed.

14. A rail launcher according to claim 10, further characterised in that the side track adaptors are provided with slots adapted to receive CEE-hangers present in a Sparrow hanger configuration in one configuration of the side track adaptors in the side tracks, and adapted to receive CEE-hangers present in an AMRAAM hanger configuration when the side track adaptors are in their inverse configuration in the side tracks.

15. A rail launcher according to claims 10, further characterised in that the side rail adaptors are longitudinally slidably received in the side tracks, the side tracks having a re-entrant profile thereby to retain said side track adaptors against sideways displacement.

16. A rail launcher adaptable for cooperation with airborne missiles having differing hanger configurations by providing a plurality of rail configurations, said launcher comprising a single fixed rail having a central longitudinal track in its underside and a pair of side tracks, and removable rail track adapters for both the central track and the pair of side tracks, a change of rail configuration being achievable by slidably removing said central track adapter, and by inverting the side track adapters, the side track adapters being vertically asymmetrical.

\* \* \* \* \*